United States Patent [19]

Hongo

[11] Patent Number: 5,287,607
[45] Date of Patent: Feb. 22, 1994

[54] METHOD FOR FINISHING SURFACE OF COMMUTATOR

[75] Inventor: Nobuhisa Hongo, Kiryu, Japan

[73] Assignee: Mitsuba Electric Manufacturing Co. Ltd., Gunma, Japan

[21] Appl. No.: 925,124

[22] Filed: Aug. 6, 1992

Related U.S. Application Data

[63] Continuation of Ser. No. 501,249, Mar. 28, 1990, Pat. No. 5,177,842.

[51] Int. Cl.[5] .......................... B23P 13/00; B23B 1/00
[52] U.S. Cl. ....................................... 29/27 R; 82/1.11
[58] Field of Search .................... 29/27 B, 27 R, 27 C; 409/293; 82/18, 117, 123, 129, 144, 173, 1.11; 51/330, 328

[56] References Cited

U.S. PATENT DOCUMENTS 1,947,800  2/1934  Rupple ................................ 82/129
4,862,575  9/1989  Shirai et al. ..................... 409/293 X
5,065,651  11/1991 Amey ................................. 82/1.11

FOREIGN PATENT DOCUMENTS

120901  6/1987  Japan ..................................... 82/123
109682  4/1990  Japan ..................................... 51/330

Primary Examiner—William Briggs
Attorney, Agent, or Firm—Rodman & Rodman

[57] ABSTRACT

A method and apparatus for finishing a surface of a commutator of a motor, in which a distance between a surface to be finished and a reference position is measured in advance prior to the surface-finishing, and thereafter, turning, cutting or buffing is performed. The data of distance measuring is utilized for the surface-finishing later. Opposite ends of a shaft of the commutator are supported and the supported ends are rotated at uniform speeds. The commutator during the turning is variably controlled in accordance with a turning position.

5 Claims, 7 Drawing Sheets

METHOD FOR FINISHING SURFACE OF COMMUTATOR

This is a continuation of application Ser. No. 501,249, filed Mar. 28, 1990, now U.S. Pat. No. 5,177,842.

BACKGROUND OF THE INVENTION

1. Field of the Invention

This invention relates to a method and apparatus for finishing a surface of a commutator of a motor, and more particularly to techniques to finish an end face on the side in contact with brushes out of end faces of the flat type commutator of a motor as used in a fuel feed pump of a motor vehicle.

2. Description of the Related Art

In the techniques of finishing the surface of the commutator of the motor of the type described, when an end face of the commutator on the side in contact with the brushes is finished, it is thought of finishing the surface by grinding for example.

Now, it has been made clear by the inventor of the present invention that, by the normal surface finishing techniques, merely the surface roughening of the end face to be contacted with the brushes is performed and it is unable to solve the problem such as ununiformity in service life due to variation of positions of the commutator pressed into a shaft of an armature.

SUMMARY OF THE INVENTION

It is an object of the present invention to provide a technique for obtaining a uniform service life of a motor by providing uniformity in the thickness of segments of a commutator of the motor.

It is another object of the present invention to provide a technique of eliminating of burrs on a finished surface of the commutator.

It is a further object of the present invention to provide a technique of performing uniform finishing all over the entire surface to be finished.

It is a still further object of the present invention to provide a technique of improving fitting of the commutator to brushes, particularly, improving fitting at the first stage of contact to the brushes.

To achieve the above-described objects, according to the method of finishing the surface of the commutator of the motor of the present invention, after a distance between the surface to be finished of the commutator and a reference position is measured in advance, the surface-finishing of the surface to be finished is performed on the basis of the thus measured data.

The above-described process of finishing the surface may be made by a process of turning the surface to be finished or a process of cutting the same.

Further, after the turning or cutting process, a process of buffing the surface to be finished to surface-roughen the same may be included.

Supported opposite ends of the commutator during the above-described turning or buffing process may be rotated at speeds equal to each other.

A rotational speed of the commutator during the above described turning process may be variably controlled in such a manner that a rotational speed of the peripheral portion of the surface to be finished during the turning becomes gradually slower than a rotational speed of the central portion of the surface to be finished during the turning.

The above-described buffing may be performed in a direction perpendicular to the surface to be finished.

Furthermore, an apparatus for finishing the surface of the commutator according to the present invention comprises: a means for supporting the commutator from opposite sides; a means for measuring a distance between the surface to be finished of the commutator and a reference position prior to the finishing; a means for storing data measured by the measuring means; and a means for finishing the surface to be finished on the basis of the measured data delivered from the storing means.

The above described distance measuring a distance between the surface to be finished of the commutator and an end face on a side opposite to an axis of the commutator.

The above described means for finishing the surface is constituted by a means for turning or cutting the surface to be finished.

The above-described means for finishing the surface further includes a means for buffing the surface to be finished.

The apparatus for finishing the surface to be finished of the commutator of the motor includes a means for rotating supported opposite ends of the commutator, which are finished by the turning means or the buffing means, at speeds equal to each other.

The above described means for rotating the supported opposite ends at the speed equal to each other includes a countershaft for transmittingly connecting the opposite end supporting means of the commutator to each other, the countershaft transmitting a rotary driving force from a rotary driving source to the opposite end supporting means.

The apparatus for finishing the surface to be finished of the commutator of the motor includes a means for variably controlling the rotational speed of the commutator being turned by the turning means in accordance with a turning position.

The above-described buffing means is a means for buffing the surface to be finished in a direction perpendicular thereto , e.g. a wire buff.

The apparatus for finishing the surface to be finished of the commutator of the motor includes a protective member for covering a portion not required to be finished of the commutator during the buffing by the buffing means.

The above described protective member has a means for supplying a gas into the area protected by the protective means.

The above-described supporting means rotatably supports the shaft located at the center of the commutator from the opposite ends.

BRIEF DESCRIPTION OF THE DRAWINGS

The above and other objects and features of the present invention will become more apparent when referred to the following descriptions given in conjunction with the accompanying drawings, wherein like reference numerals denote like elements, and in which.

DETAILED DESCRIPTION OF THE PREFERRED EMBODIMENT

Figure 1:
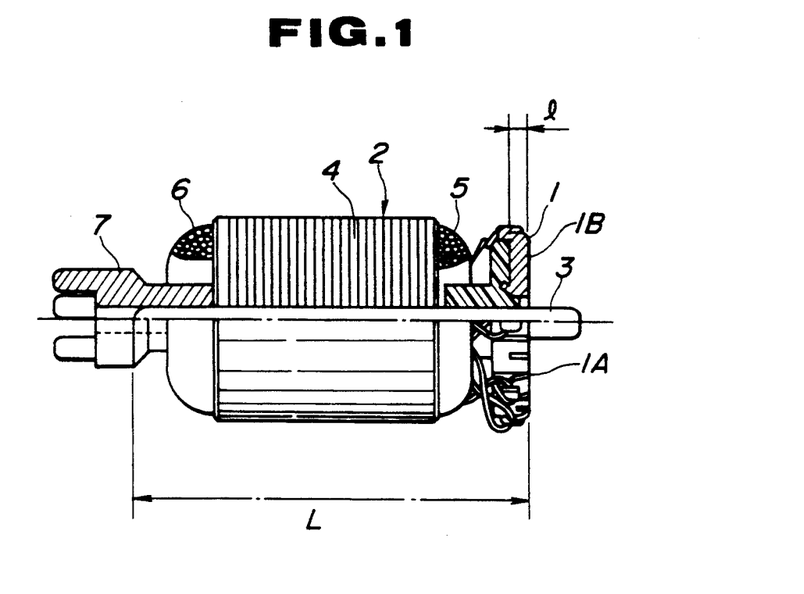
FIG. 1 is a frontal view showing an example of the commutator of the motor, to which is applicable the present invention.

Referring to the drawings, a commutator of a motor, to which the present invention is applied, has a construction shown in FIG. 1. Namely, a commutator 1 is resin molded as one unit wherein a plurality of fan-shaped segments 1B are disposed in the circumferential direction. The commutator 1 is pressed onto and disposed at an end of a shaft 3 extending along a central axial line of an armature assembly 2, i.e. at the right end in FIG. 1. Position of the commutator 1 on the shaft is distributed.

The armature assembly 2 is constructed such that a coil 5 is wound around an armature core 4 of a laminated type, which is provided around the shaft 3. Side insulators 6 are provided at opposite ends of the core 4.

Furthermore, a driving finger 7 is mounted to the other end of the shaft 3, i.e. at the left end in FIG. 1. This driving finger 7 is transmittingly connected to a driving portion of a fuel feed pump, not shown.

The method and apparatus for finishing the surface according to the invention are adapted to perform the surface-finishing of the surface to be finished, which is a surface to be slidable on brushes, not shown, of the commutator 1.

Figure 3:
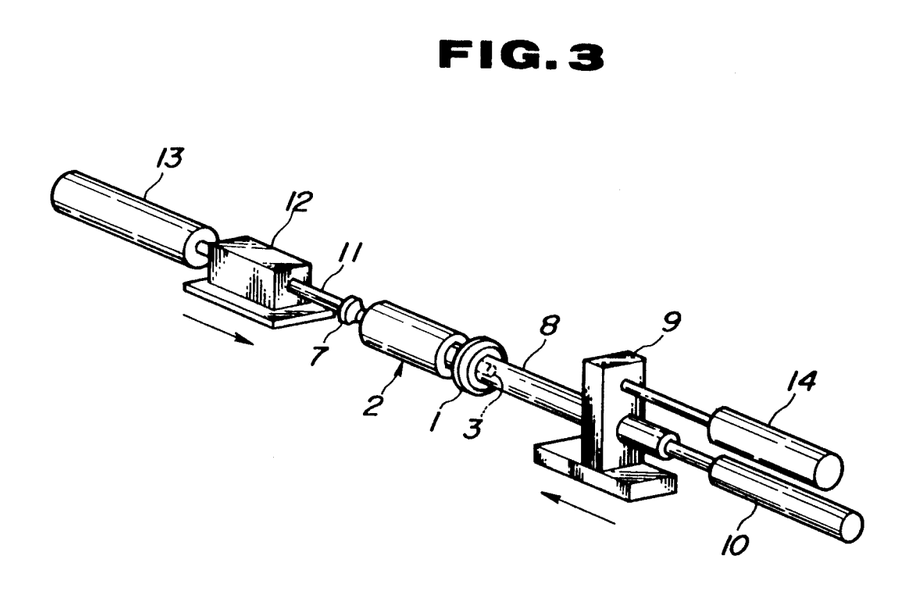
FIG. 3 is a schematic perspective view showing a distance measuring mechanism according to the invention.

Here, to describe in detail the method and apparatus for finishing the surface according to the invention, firstly, the distance measuring mechanism shown in FIG. 3 has such constructions that respective end portions of the shaft 3 extending through the centers of the commutator 1 and the armature assembly 2 are supported in the axial directions. One of the supporting constructions includes: a support shaft 8 for supporting an end of the shaft 3 outwardly projecting from the surface 1A of the commutator 1; a mounting base 9 connected to the support shaft 8; and an air cylinder 10 for rectilinearly moving the support shaft 8 and the moving base 9 to axially approach or retract from the shaft 3 of the commutator 1 and the armature assembly 2.

Furthermore, the other of the supporting constructions includes: a support shaft 11 for abuttingly supporting the end portion of the shaft 3 at the side opposite to the commutator 1 in the driving finger 6; a guide 12 for supporting and guiding the support shaft 11; and an air cylinder 13 for rectilinearly moving the support shaft 11 and the guide 12 to axially approach or retract from the shaft 3.

Further, in this embodiment, the moving base 9 is secured thereto with a linear scale 14 as being an example of the distance measuring means. As indicated by L in FIG. 1, the linear scale 14 is adapted to measure a distance between the surface 1A of the commutator 1 and an end face of the shaft 3 at the side opposite to the commutator 1.

The results of distance measuring by use of the linear scale 14 are utilized as data for finishing in the turning or cutting of the surface 1A, and further, the buffing the same, during and after the succeeding process. For this, as indicated by a control circuit in FIG. 4, the linear scale 14 is connected to a CPU of a microcomputer through an interface 16 and a controller 17. By this, the CPU 15 stores the data of distance measuring obtained by the linear scale 14 and can control the finishing on the basis of the measured data during and after the succeeding process.

The turning mechanism according to the invention will hereunder be described with reference to FIGS. 5 to 7.

In this turning mechanism, the opposite ends of the shaft 3 of the commutator 1 and the armature assembly 2 are rotatably supported by spindles 18 and 19. The spindles 18 and 19 can rectilinearly move in the axial direction. In FIG. 5, there is shown the rectilinearly moving mechanism including a motor 20, a pulley 21, a belt 22, a pulley 23, a threaded shaft 24 and a movable table 25, for rectilinearly moving one of the spindles 18. Not shown though, with the other of the spindles 19, a rectilinearly moving mechanism for rectilinearly moving the spindle 19 through a movable table 26 is provided. With these rectilinearly moving mechanisms, the opposite ends of the shaft 3 extending through the centers of the commutator 1 and the armature assembly 2 can be supported or released.

The above-described two spindles 18 and 19 are each provided with a uniform rate rotating mechanism for rotating these spindles 18 and 19 at the same speeds. Namely, this uniform rate rotating mechanism includes: a motor 27, a pulley 28, a belt 29, a pulley 30, a countershaft 31, a pulley 32 on the countershaft 31, a belt 33 for transmittingly connecting the pulley 32 to the spindle 18, a pulley 34 on the countershaft 31 and a belt 35 for transmittingly connecting the pulley 34 to the spindle 19. With these uniform rate rotating mechanisms, both spindles 18 and 19 rotate at speeds different from each other, so that the supported portions of the shaft 3 can avoid damage.

On the other hand, a finishing tool or bite 36 as the turning means for turning the surface 1A of the commutator 1 is held vertically movable by a holding member 37 such that a nose of the bite 36 faces a position opposed to the surface 1A.

To move the bite 36 vertically, a threaded shaft 38 is vertically threadably coupled into the holding member 37, whereby this threaded shaft 38 is rotatably driven by a motor 39 through a pulley 40, a belt 41 and a pulley 42, so that the holding member 37 and the bite 36 can be moved in the vertical direction.

To detect the vertical position of this bite 36, the holding member 37 is provided thereon with a potentiometer 43. This potentiometer 43, utilizing a change in the resistivity fluctuated by a position of the nose of the bite 36, detects a position of the bite 36 in the vertical direction. By this, depending on whether a position of contact between the surface 1A of the commutator 1 and the nose of the bite 36 is at the central portion of the surface 1A or the outer peripheral portion thereof, a circumferential speed of the rotation of the surface 1A is changed, whereby the turning of the surface 1A can be performed stably with the speed of the vertical movement of the bite 36 being constant and the linear speed of rotation of the surface 1A being constant, so that burrs can be prevented from occurring.

Figure 7:
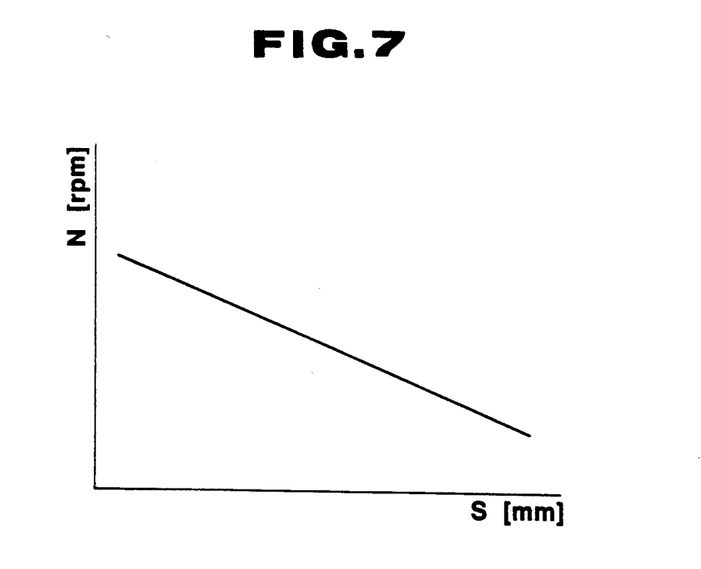
FIG. 7 is a view showing changes in the rotational speed of the commutator in the turning mechanism shown in FIGS. 5 and 6.

Incidentally, FIG. 7 shows the interrelation between a rotary speed N (rpm) of the surface 1A of the commutator 1 and a dimension S (mm) from the center of the shaft 3 to the nose of the bite 36.

In order to control the distance L from the surface 1A of the commutator 1 to the end face opposite to the commutator 1, the circumferential speed of rotation of the surface 1A and the speed or distance of the vertical movement of the bite 36 in association with one another, the motor 20 is connected to the CPU 15 through a driving circuit 44 and an interface 45, further, the motor 39 is connected to the CPU 15 through a driving circuit 46 and an interface 47 and the potentiometer 43 is connected to the CPU 15 through an interface 47.

Figure 8:
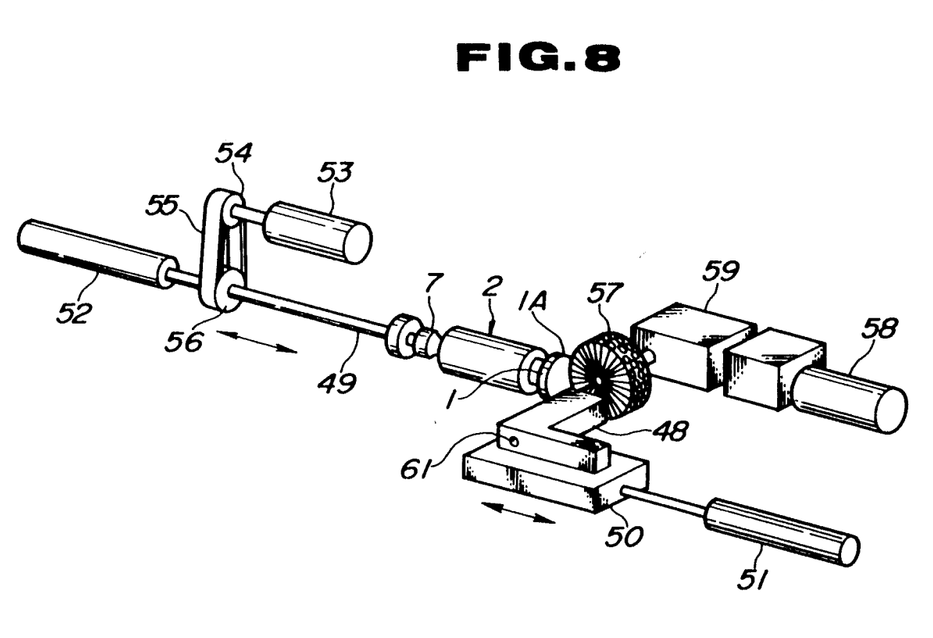
FIG. 8 is a schematic perspective view of a buffing mechanism according to the invention.

An example of a buffing mechanism according to the present invention will hereunder be described with reference to FIGS. 8 and 9.

Figure 2:
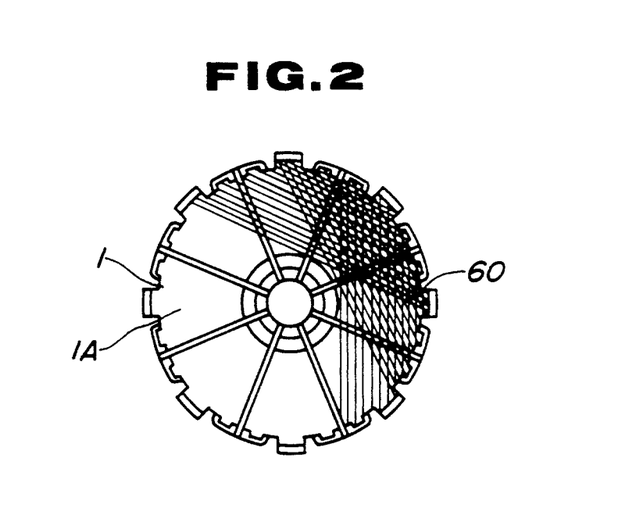
FIG. 2 is a view showing the finishing pattern of the surface to be finished of the commutator, which has been buffed by the method of finishing the surface according to the invention.

This buffing mechanism includes: a support cover 48 and a support shaft 49 for supporting the ends of the shaft 3 extending through the commutator 1 and the armature assembly 2; a mounting base 50 for mounting this support cover 48; an air cylinder 51 for rectilinearly moving the support cover 48 and the mounting base 50 along the axial line of the shaft 3; an air cylinder 52 for rectilinearly moving the support shaft 49 along the axial line of the shaft 3; a motor 53 for rotating the support shaft 49; a pulley 54; a belt 55; a pulley 56; a wire buff 57 disposed in a direction perpendicular to the surface 1A of the commutator 1 to buff the surface 1A; a motor 58 for rotating this wire buff 57; and a gear box 59 for transmitting the rotation of the motor 58 to the wire buff 57. Since the wire buff 57 is rotated in contact with the surface 1A of the commutator 1 from a direction perpendicular to the surface 1A, rectilinear buffing lines as shown in FIG. 2 are given to the surface 1A. Through rotating the commutator 1 by the motor 53, the rectilinear buffing lines give a buffing pattern, in which the buffing lines cross in a mesh like shape, to the surface 1A as indicated by reference numeral 60 in a portion of FIG. 2, whereby the surface 1A is surface roughened. By this, fitting of the surface 1A to the brushes, not shown, is improved.

Figure 9:
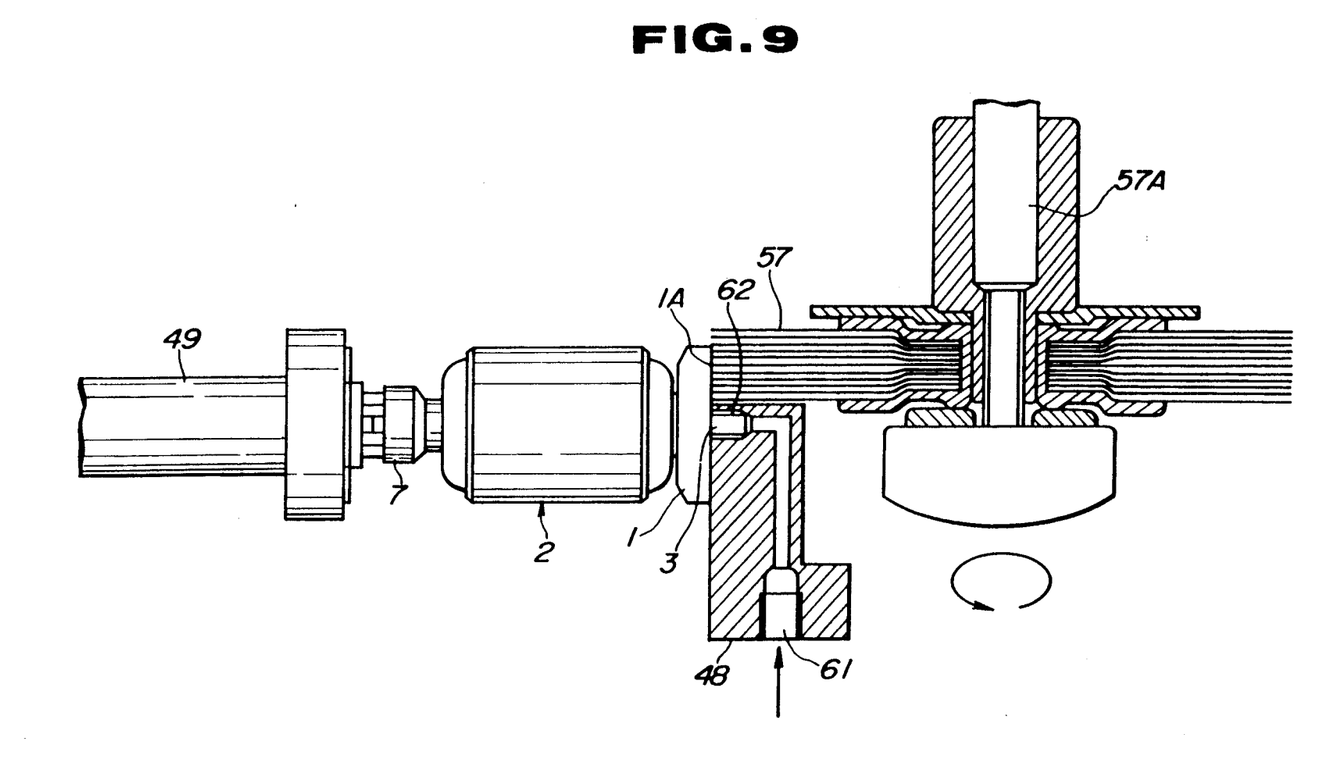
FIG. 9 is a partially sectional view showing the essential portions of the buffing mechanism shown in FIG. 8.

Furthermore, in this embodiment, as shown in FIG. 9, formed in the support cover 48 is a gas feed port 61 which is communicated with a space 62 covering a supported end of the shaft 3. Accordingly, a gas such as compressed air is delivered under pressure into the space 62 through the gas feed port 61, so that such disadvantages can be obviated that cuttings produced during the buffing by the wire buff 57 intrude into the space 62 to damage the shaft 3.

The surface-finishing operation in this embodiment will hereunder be described.

Firstly, in the first process, namely, the distance measuring process, as shown in FIG. 3, by the two air cylinders 10 and 13, the support shaft 8 and the moving base 9, and the support shaft 11 and the guide 12 are rectilinearly moved to approach to each other in the axial line of the shaft 3 extending through the commutator 1 and the armature assembly 2, whereby the ends of the shaft 3 are supported by the support shafts 8 and 11, respectively.

Figure 4:
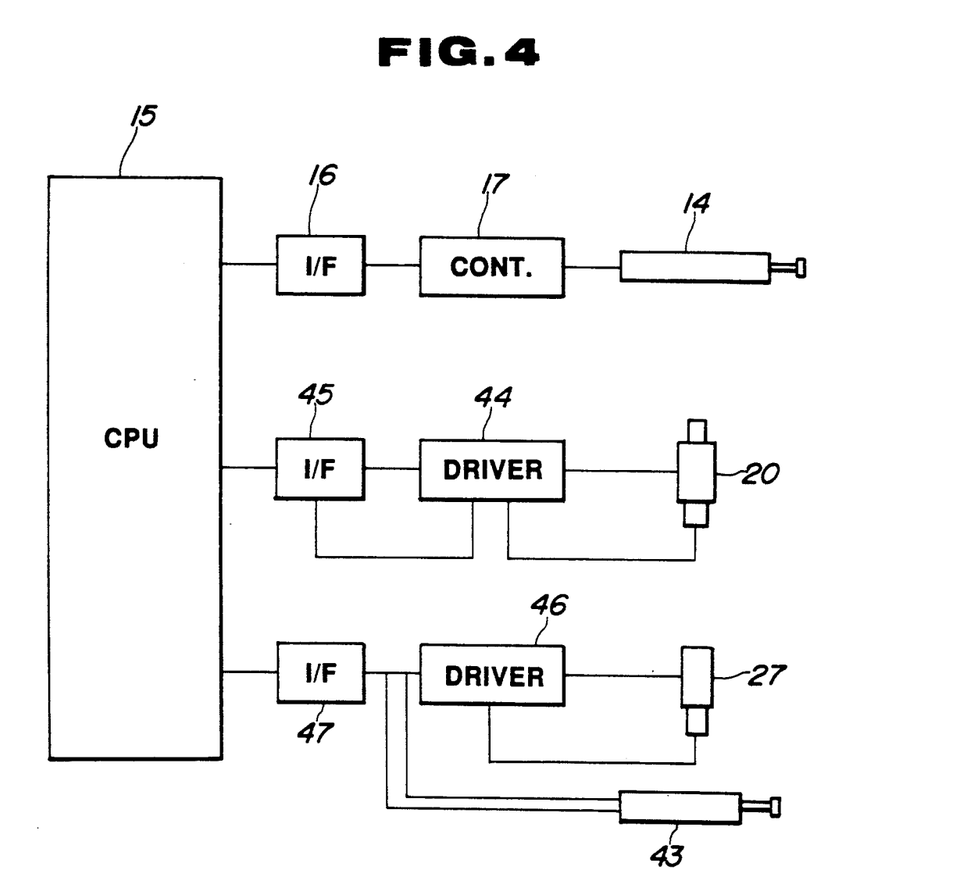
FIG. 4 is a block diagram of a control circuit according to the invention.

At this time, the distance L between the surface 1A of the commutator 1 and the end of the shaft 3, which is opposite to the commutator 1, i.e. the end face of the shaft 3 extending into the driving finger 7 as shown in FIG. 1 is measured by the linear scale 14. The results of measuring of L are stored in the CPU 15 of the microcomputer as shown in FIG. 4, for being utilized as data for finishing during the turning or buffing of the surface 1A, which is the succeeding process.

This distance measuring is thus performed and the data of measuring are utilized in the succeeding process, whereby the surface-finishing during the succeeding process can be performed with the condition of finishing, e.g. a cut-in value of turning by the bite 36, being adjusted so that uniform surface finishing can be achieved.

Thereafter, the commutator 1 and the armature assembly 2 are delivered to the turning process, which is the succeeding process.

Figure 5:
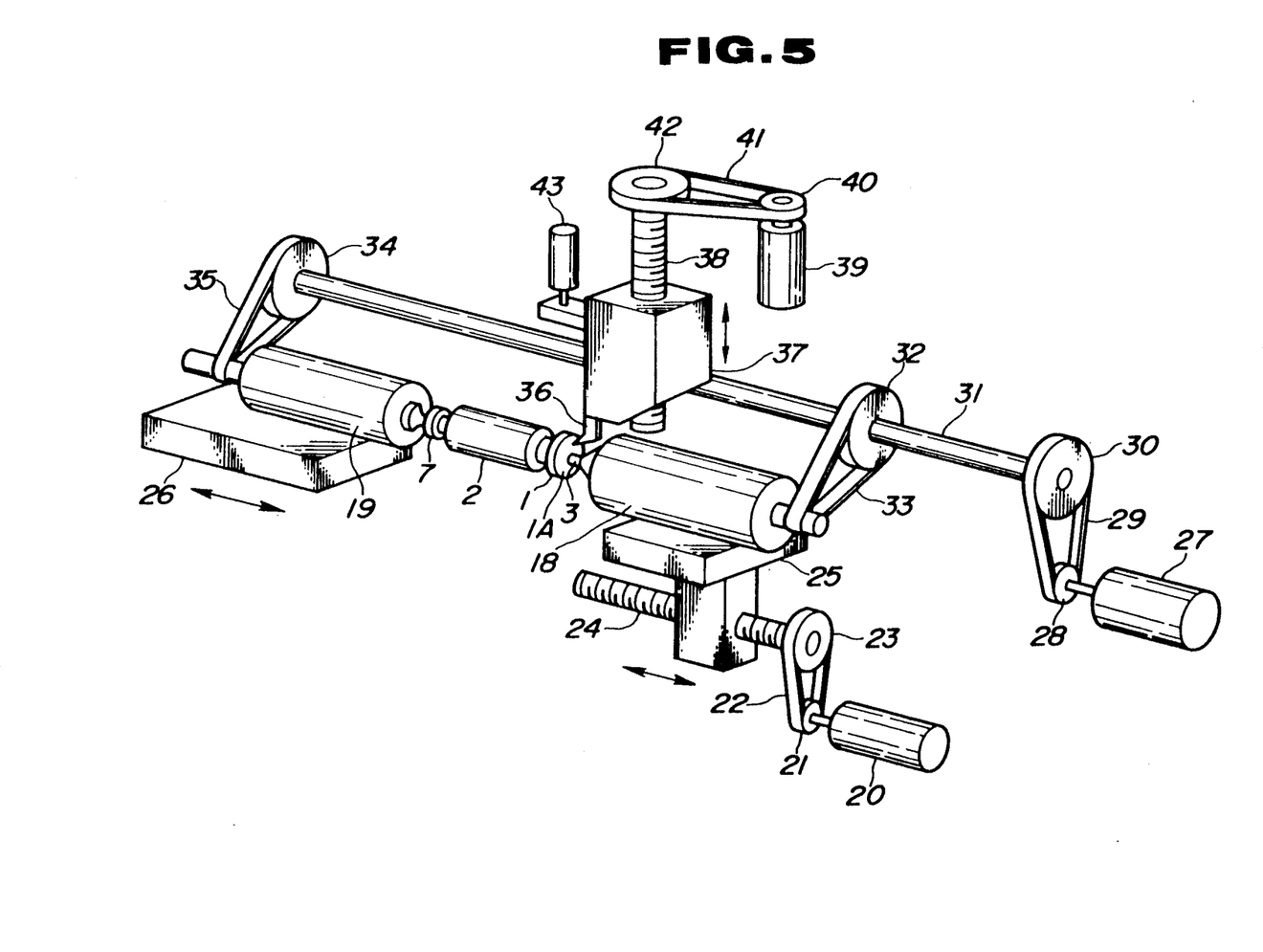
FIG. 5 is a schematic perspective view of a turning mechanism according to the invention.
Figure 6:
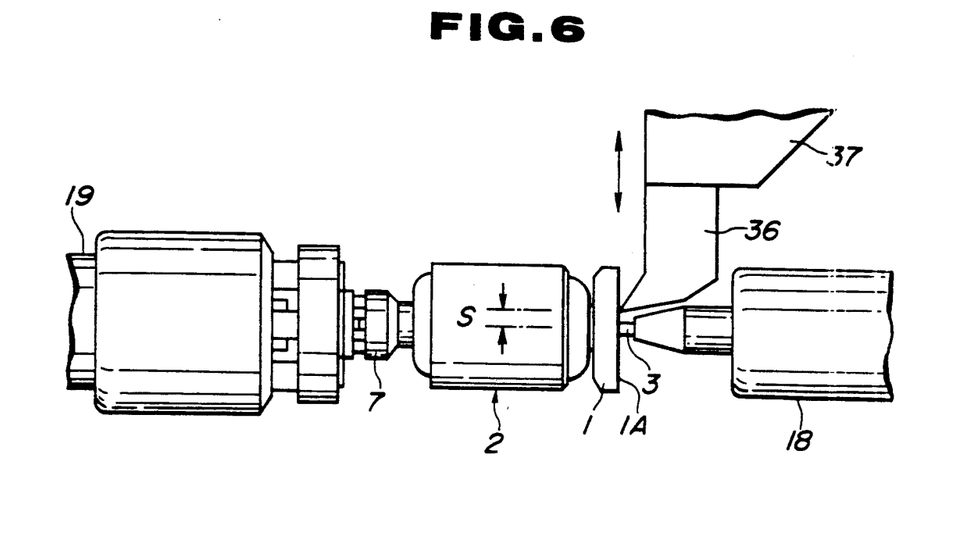
FIG. 6 is a frontal view showing the essential portions of the turning mechanism.

As shown in FIGS. 5 and 6, in this turning process, the ends of the shaft 3 extending through the commutator 1 and the armature assembly 2 are supported by the spindles 18 and 19, respectively. At this time, the spindles 18 and 19 are rectilinearly moved by the motor 20, the threaded shaft 24 and the movable tables 25, 26 to approach to each other, so that the ends of the shaft 3 can be supported.

Then, the spindles 18 and 19 are rotated at the uniform speeds by the motor 27 through the belt 29, the countershaft 31, the belts 33, 35, the pulleys 28, 30, 32 and 34, the holding member 37 and the bite 36 are adjusted in the vertical direction by use of the motor 39, the threaded shaft 38, the belt 41, the pulleys 40, 42, and the nose of the bite 36 is pressed on the center of the surface 1A of the commutator 1.

The surface 1A of the commutator 1 is turned by the nose of the bite 36 by a given value according to the calculation result of CPU based on the measured data. At this time, as the turning proceeds, the bite 36 together with the holding member 37 are raised upward at a given speed by use of the motor 39, the threaded shaft 38 and the like. By this, the surface 1A of the commutator 1 is successively turned by a given value from the center to the outer periphery thereof.

At this time, in this embodiment, during the preceding process, the distance L from the surface 1A of the commutator of the shaft 3 is measured by the linear scale 14 in advance, and the data of measuring are stored in the CPU, whereby the motor 20 and the like are controlled by the result of calculation of the measuring data. Thus, the value of turning of the surface 1A by the bite 36 is controlled to obtain a given thickness of the segments B for all of the commutators 1. Namely, the surface 1A to be finished is measured to control the cut in value of the bite 36 in accordance with the distribution of positions of the commutators 1 pressed onto the shaft, enabling the surface of the commutator to be finished with constant thickness of segments 1B.

As the turning by the bite 36 proceeds from the center to the outer periphery of the surface 1A, the linear speed of points on the surface 1A increases. Therefore, in this embodiment, the rotational speed of the motor 27 is controlled on the basis of the results of detecting the dimension S (FIG. 6) from the center of the shaft 3 to the nose of the bite 36 as detected by the potentiometer 43.

Namely, to state in detail, as shown by a graphic chart in FIG. 7, when the dimension S is small in value, the rotational speed of the motor 27, i.e. the rotational speed N of the surface 1A is increased, and, as the dimension S increases, the rotational speed is decreased. By this, the linear speed of points on the surface 1A engaged by the bite 36 is held constant at all times, so that the stabilized turning can be performed.

Further, in this embodiment, the two spindles 18 and 19 are rotated at the uniform speeds by use of one motor 27, the countershaft 31 and the like, thus obviating such a disadvantage that the supported ends of the shaft 3 supported by the spindles 18 and 19 as in the case where there is a difference in the rotational speeds between the spindles 18 and 19.

As described above, the commutator 1 having the surface 1A turned may be used as it is, however, in this embodiment, buffing of the surface 1A is performed as an example of the final finishing process.

This buffing process will hereunder be described. As shown in FIGS. 8 and 9, under a state where the ends of the shaft 3 extending through the commutator 1 and the armature assembly 2 are supported by the support cover 48 and the support shaft 49 and the wire buff 57 having a rotary shaft 58A intersecting the shaft 3 perpendicularly is brought into contact with the surface 1A of the commutator 1 in a direction perpendicular to the surface 1A, the wire buff 57 is rotated at high speed by the motor 58.

By this, as shown in FIG. 2, the surface 1A, being drawn thereon with the rectilinear buff lines, is finished. Furthermore, the commutator 1 is continuously or intermittently rotated at a required speed by the motor 53 through the support shaft 49, so that, as indicated by reference numeral 60 in FIG. 2, the surface 1A is finished by the buffing pattern, in which the straight line cross in the mesh-like shape.

By this, the surface 1A is applied thereto with the surface-roughening of a required degree of roughness, and fitting to the brushes, not shown, becomes satisfactory in the properties at the first stage during the time of use thereafter.

Moreover, in this embodiment, the clean gas is introduced under pressure into the space 62 around the supported ends of the shaft 3 through the gas feed port 61 during the buffing, thus eliminating such a problem that the cuttings produced during the buffing intrude into the space 62 to damage the shaft 3.

The preferred embodiment of the present invention has been described in detail as above, however, the present invention should not necessarily be limited to the preceding embodiment, and other various modifications can be adopted.

For example, the linear scale 14 as being the distance measuring means may be replaced with a dial gauge, a differential transformer, a laser length measuring machine or the like.

The reference position for the distance measuring may be selected at any of other positions.

Further, it is possible that the turning for the surface-finishing may be replaced with the cutting by the rotation of the bite and the movement of the work.

In the preceding embodiment, the commutator is axially supported at opposite ends of the shaft 3 which is the center axis of the commutator, to advantageously provide accurate support and rotation. However, any other supporting system may be adopted.

As has been described hereinabove, according to the present invention, the distance between the surface to be finished of the commutator and the reference position is measured in advance prior to the surface-finishing, and the surface-finishing is performed on the basis of the measured data, so that such outstanding advantages can be achieved that the constant surface-finishing can be achieved at all times, occurrence of burrs can be controlled to a constant degree and the remaining plate thickness of the commutator can be controlled to a constant value to make the surface uniform.

What is claimed is:

1. A method of finishing an end surface of a flat type commutator of a motor including a shaft, a core provided on the shaft, a coil wound around the core and a flat type commutator pressed onto the shaft and to which the coil is connected comprising,
   a) measuring in advance the initial longitudinal distance between the unfinished end surface and an end face of a shaft of the commutator opposite the unfinished end surface,
   b) determining in advance the final longitudinal distance between the finished end surface and the end face of the shaft opposite the unfinished end surface based on a predetermined amount of cut,
   c) setting a finishing tool at the final longitudinal distance from the end face of the shaft opposite the unfinished end surface for engagement with the unfinished end surface and arranging the finishing tool to cut the unfinished end surface while the unfinished end surface is rotated about a central longitudinal axis, and
   d) laterally moving the finishing tool with respect to the unfinished end surface while maintaining the finishing tool at the final longitudinal distance from the end face of the shaft opposite the unfinished end surface to remove material of the commutator from the unfinished end surface such that all portions of the finished end surface are at the final distance form the end face of the shaft opposite the unfinished end surface.

2. The method of claim 1 including supporting the motor at opposite ends of the commutator shaft and rotating such opposite ends at equal speeds while removing material from the end surface.

3. The method of claim 1 including variably controlling the rotational speed of the commutator while removing material from the end surface such that the relative linear speed between the finishing tool and the portion of the end surface that is engaged by the finishing tool is constant.

4. The method of claim 1 wherein the steps of measuring, setting and finishing tool and laterally moving the finishing tool are accomplished automatically.

5. A method of finishing an end surface of a flat type commutator of a motor including a shaft, a core provided on the shaft, a coil wound around the core and a flat type commutator pressed onto the shaft and to which the coil is connected comprising,
   a) measuring in advance the initial longitudinal distance between the unfinished end surface and an end face of a shaft opposite the unfinished end surface,
   b) determining in advance the final longitudinal distance between the finished end surface and the end face of the shaft opposite the unfinished end surface based on a predetermined amount of cut,
   c) setting a finishing tool at the final longitudinal distance from the end face of the shaft opposite the unfinished end surface for engagement with the unfinished end surface and arranging the finishing tool to cut the unfinished end surface while the unfinished end surface is rotated about a central longitudinal axis, d) laterally moving the finishing tool with respect to the unfinished end surface while maintaining the finishing tool at the final longitudinal distance from the end face of the shaft opposite the unfinished end surface to remove material of the commutator from the unfinished end surface such that all portions of the finished end surface are at the final distance form the end face of the shaft opposite the unfinished end surface, and e) roughening the finished end surface with a buffing tool after the end surface is at the final longitudinal distance form the end face of the shaft opposite the unfinished end surface and wherein the buffing is performed by relative rotation between the finished end surface and a buffing tool having an annular periphery such that the annular periphery of the buffing tool engages the finished end surface.

* * * * *